US006702947B2

(12) United States Patent
Noïk et al.

(10) Patent No.: US 6,702,947 B2
(45) Date of Patent: Mar. 9, 2004

(54) SEPARATION DEVICE AND METHOD COMPRISING A TUBULAR ELECTROCOALESCER

(75) Inventors: Christine Noïk, Le Pecq (FR); Jean Trapy, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/140,179

(22) Filed: May 8, 2002

(65) Prior Publication Data
US 2002/0166820 A1 Nov. 14, 2002

(30) Foreign Application Priority Data
May 10, 2001 (FR) .............................. 01 06217

(51) Int. Cl.[7] .................................................. C02F 1/46
(52) U.S. Cl. .................... 210/748; 210/788; 210/512.1; 204/554; 204/660; 204/671
(58) Field of Search ................. 210/748, 787, 210/788, 512.1; 204/554, 660, 670, 671

(56) References Cited

U.S. PATENT DOCUMENTS

| 4,116,790 A | | 9/1978 | Prestridge |
| 4,338,178 A | | 7/1982 | Efimov et al. |
| 5,352,343 A | * | 10/1994 | Bailes et al. |
| 5,575,896 A | * | 11/1996 | Sams et al. |
| 5,643,469 A | * | 7/1997 | Prevost et al. |
| 5,647,981 A | | 7/1997 | Prevost et al. |
| 5,861,087 A | * | 1/1999 | Manning |

* cited by examiner

*Primary Examiner*—Blaine Copenheaver
(74) *Attorney, Agent, or Firm*—Antonelli, Terry, Stout & Kraus, LLP

(57) ABSTRACT

The present invention relates to a device for separating an effluent comprising phases of different density and conductivity, the device comprising a pair of electrodes (12, 13), means (10) for introducing the effluent between said electrodes, means intended for separation (3) and discharge (4) of said separated phases. According to the invention, the separation means comprise at least one centrifugal element including a helical channel (19) in which the effluent is centrifuged after passing between the electrodes.

11 Claims, 2 Drawing Sheets

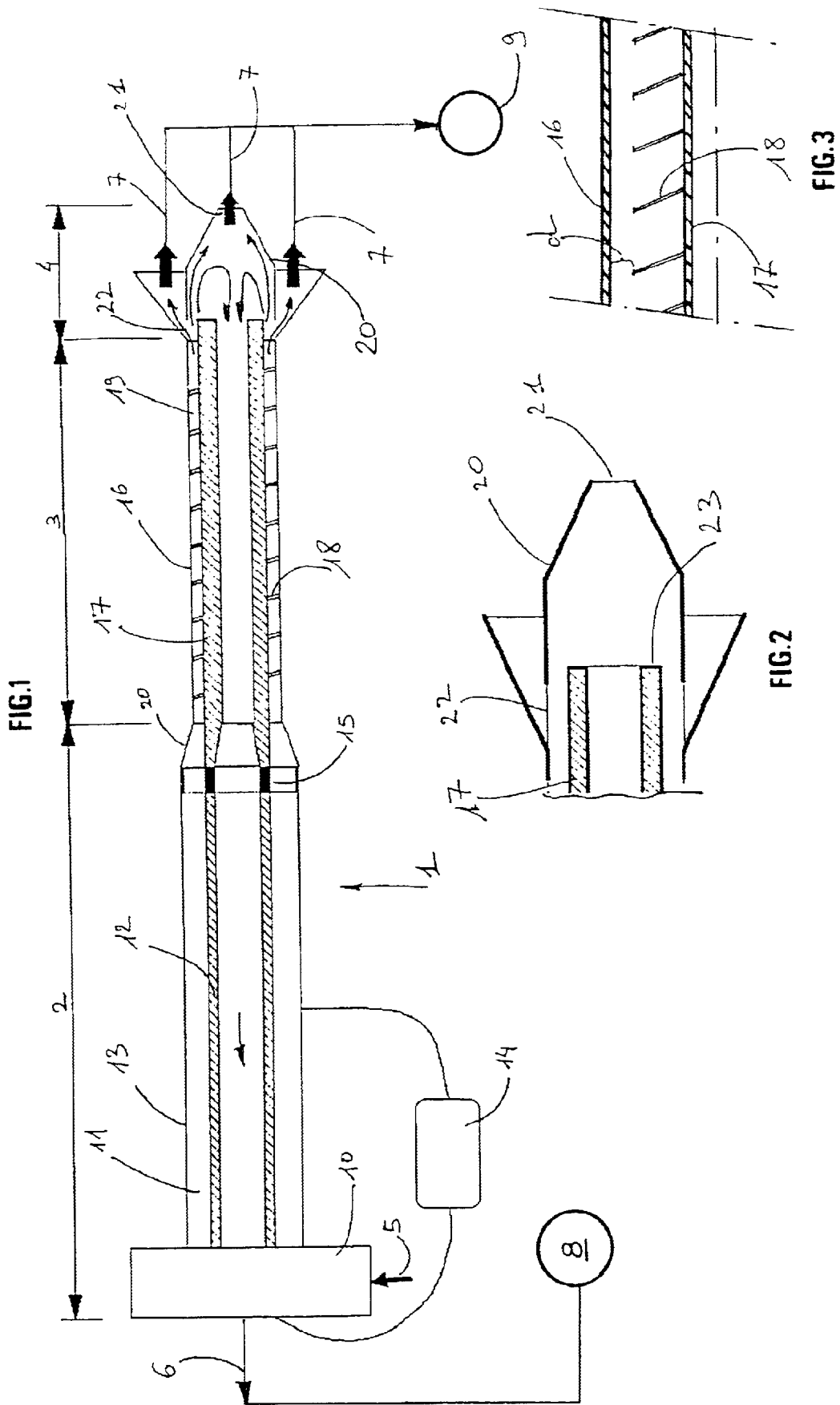

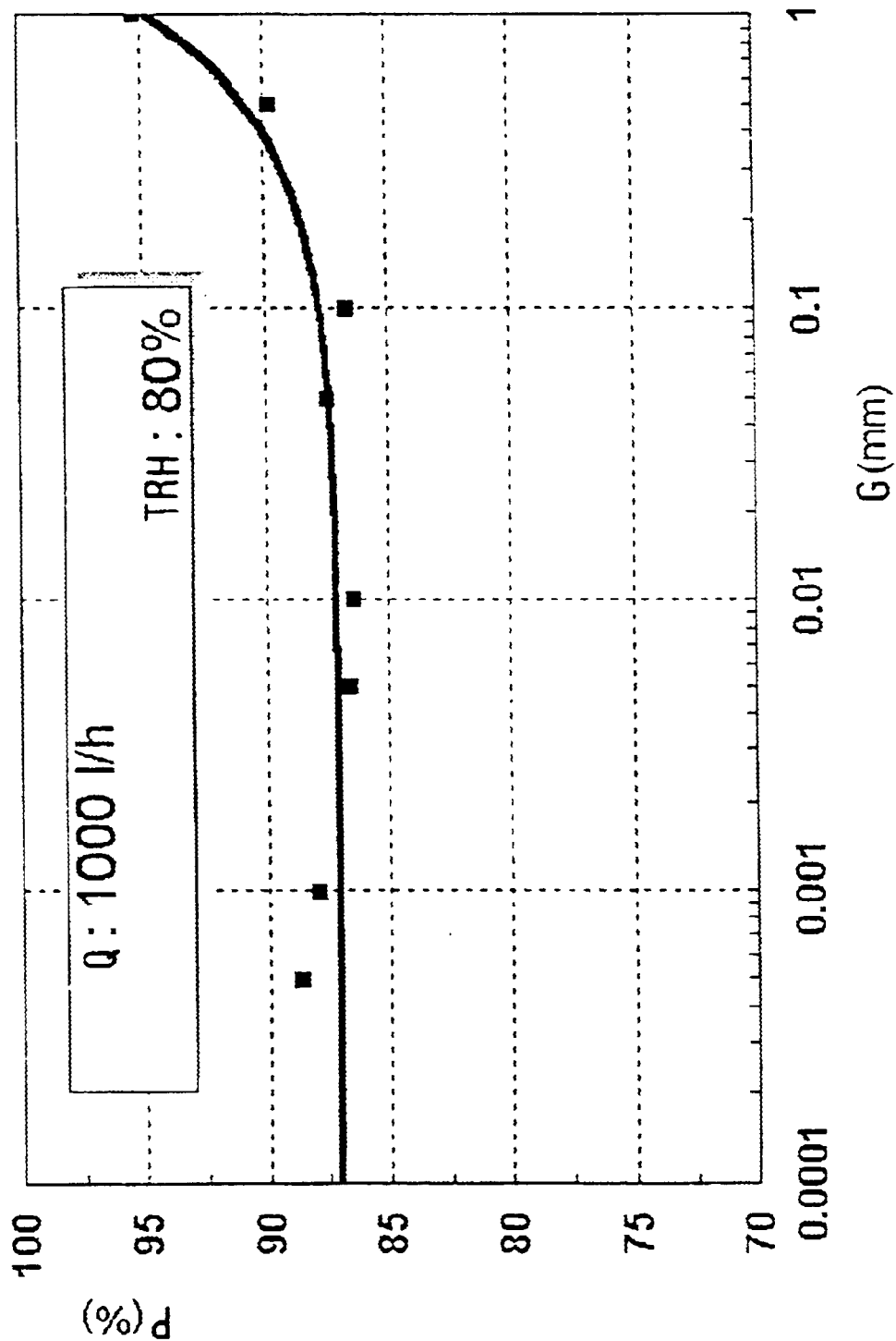

SEPARATION DEVICE AND METHOD COMPRISING A TUBULAR ELECTROCOALESCER

FIELD OF THE INVENTION

The present invention relates to the field of emulsified effluent processing, notably petroleum effluents from production wells. The emulsions concerned are those whose disperse phase is electrically conducting, unlike the continuous phase, for example water dispersed in an organic phase such as oil.

It is important to separate the water from the effluent produced so as to limit the size of the processing and transport equipments. After passing the emulsified effluent through conventional water/oil separators, the effluent still contains about 1 to 5% of water emulsified in the oil. The goal of the present invention is to decrease these residual amounts of water and salts in order to meet the technical requirements of the downstream processes.

BACKGROUND OF THE INVENTION

Document U.S. Pat. No. 5,647,981 describes a device which combines the principle of an electrocoalescer with centrifugation.

Water-in-oil emulsions can be broken by coalescence of the water drops through the action of an electric field. However, in order to increase the efficiency of these electrostatic separators, one tries to increase the electric potential between the electrodes, with a real risk of appearance of breakdown phenomena between electrodes. On the other hand, considering the residence time required between the electrodes, the flow of effluent that can be treated is low, unless an installation of disproportionate size is used.

The present invention overcomes these known drawbacks by optimizing the combination between an electrocoalescer of determined size and centrifugal and separation means specific to said coalescer.

SUMMARY OF THE INVENTION

The present invention thus relates to a device for separating an effluent comprising phases of different density and conductivity, the device comprising a pair of electrodes, means for introducing the effluent between said electrodes, means intended for separation and discharge of said separated phases. According to the invention, the separation means comprise at least one centrifugal element including a helical channel in which the effluent is centrifuged after passing between the electrodes.

The helical channel can consist of a helical wall arranged in an annular space.

The helical wall can be in contact with the internal tube but provide a clearance with the wall of the external tube.

The helical channel can consist of a helical tube.

Said electrodes can exhibit the shape of cylinders arranged along the same axis.

The section of flow of the helical channel can be so determined that the velocity of the effluent increases in relation to the velocity of the effluent in the vicinity of said electrodes.

The lighter phase can be discharged through an axial line.

The discharge means can comprise a cyclone and an axial port for discharge of at least part of the centrifuged phase.

The discharge means can comprise at least one port on the periphery of said centrifuged effluent so as to discharge at least part of the centrifuged phase.

The invention also relates to a method of separating an effluent comprising phases of different density and conductivity, comprising at least an electrocoalescence stage between two electrodes, a separation stage, a stage of discharge of said separated phases. According to the method, the separation stage follows the coalescence stage and includes at least a stage of centrifuging the effluent in a helical channel.

The centrifugation stage can be such that the velocity of the effluent is increased in relation to its velocity between said electrodes.

A centrifuged phase discharge stage can follow the centrifugation stage by using a cyclone into which said helical channel opens.

At least part of the centrifuged phase can be discharged through at least one port arranged on the periphery of and downstream from said helical channel.

BRIEF DESCRIPTION OF THE FIGURES

Other features and advantages of the present invention will be clear from reading the description hereafter of a non limitative example, with reference to the accompanying drawings wherein:

FIG. 1 diagrammatically shows the principle of the invention,

FIG. 2 shows a detail of the outlet of the separator according to the invention, FIG. 3 illustrates a variant of the centrifuge, FIG. 4 illustrates the efficiency of the present invention.

DETAILED DESCRIPTION

The general layout of an example of embodiment of a device according to the invention meets the following requirements:

- the fluid is preferably fed under pressure between two cylindrical and concentric walls, the tangential inlet is not essential but preferably maintained,
- the electrocoalescer has a determined geometry allowing to obtain a sufficient residence time for the effluent. For example, its length can be about 1 m and the annular space is such that the residence time of the fluid is 10 seconds at a flow rate of 500 l/h. The distance between the cylinders is therefore 7.86 mm (radius difference between a 2-inch tube (50.8 mm) and a 1-inch tube (25.4 mm)),
- a centrifuge is arranged after the electrocoalescer, whose motive element is a helical surface arranged between two concentric cylinders over a length of 500 mm. The distance between the cylinders has been reduced to 6.35 mm (radius difference between a 1.5-inch tube and a 1-inch tube) in order to increase the velocity of the fluid as it flows through the centrifuge,
- the centrifuge opens onto a separator proper. This part is essential and of delicate design in order to prevent the intense turbulence developed at the centrifuge outlet from dispersing the water droplets again.

The tubes are selected according to the petroleum industry standards in order to facilitate industrial implementation with an existing equipment.

In FIG. 1, which shows the whole of device 1 according to the invention, reference numbers 2, 3 and 4 respectively refer to the coalescer, centrifuge and separator parts. Arrow 5 shows the inflow of the effluent containing the emulsion into the device, arrow 6 shows the outflow of the dehydrated effluent sent to transport and refining installations 8, arrows 7 show the various outflows of the essentially aqueous phase sent to discharge processing installations 9.

The means for feeding the emulsified effluent into the coalescer are such that the fluid is fed tangentially into annular space 11 delimited by the outside of electrode 12 and the inside of shell 13. The dimensions of the electrocoalescer, diametral and longitudinal, are so determined that, considering the rate of injection of the effluent through means 10, the residence time in the air gap of the electrodes is such that the coalescence of the water drops is optimum. Electrodes 12 and 13 are electrically connected to an electric field generator 14. The circulation of the effluent in the coalescer being helical, electrodes 12 and 13 are preferably cylindrical in shape. At the end of the coalescer, electric insulating means 15 separate the electrodes from the inlet means of centrifuge 3.

Centrifuge 3 consists of an outer cylindrical tube 16, an inner tube 17 in continuation with central electrode 12 of the coalescer, and a helical wall 18 in contact with the inside of tube 16 and the outside of tube 17 so as to form a continuous helical channel 19 around the longitudinal axis of the device. The shape of this channel 19 is such that the effluent at the coalescer outlet is led to be centrifuged over the total length of centrifuge 3. This length is furthermore determined to optimize the centrifuging effect. Conical connection means 20 can be used between the coalescer and the centrifuge in order to reduce the main section of flow of the effluent so as to increase the velocity of flow of the fluid in the centrifuge. The higher the velocity, the better the centrifugation and therefore the phase separation.

In an equivalent way, the centrifuge can be obtained from a line of suitable section with a helical shape for centrifugation of the fluid. At least one tube can for example be helically wound around a tube.

FIG. 3 shows a variant of the centrifuge wherein helical wall 18 is not in contact with the inner wall of external tube 16. The clearance d allows formation of a layer of the centrifuged phase which can freely flow also in the longitudinal direction, i.e. downwards when the device is arranged vertically, which is generally preferable.

A separation element 4 is fastened to the end of the centrifuge. Its purpose is to remove the water drops which are in contact with the outer wall by centrifugation. A conical part 20 forming a continuation of the centrifuge produces a cyclone type separation, the centrifuged phase being discharged through port 21, the lighter phase (organic phase) being discharged in the direction of the axis of the cone through the inner space of tube 17 extended by the inner line of electrode 12. Separation element 4 furthermore comprises a lateral opening surface 22 allowing to separate the major part of the aqueous phase in contact with the inner wall of tube 16.

FIG. 2 shows more in detail the separation means. The same reference numbers as in FIG. 1 are used in this figure. It can be noted that end 23 of tube 17 is extended after opening 22. Opening 22 is preferably a complete ring so that the major part of the centrifuged aqueous liquid can be discharged through this means.

Results

All the evaluations of the devices according to the invention were made by simulating operation with the known FLUENT fluid mechanics code. The finite-volume calculation techniques used require gridding of the inner volumes by means of the GAMBIT gridder associated with the calculation code.

The conditions applied to the FLUENT code for calculation are:

Solver
   3D,
   stationary,
   <<Coupled Implicit>> (CI) or <<Segregated Implicit>> (SI) as the case may be.

Models
   Turbulence: <<realizable>> K-$\epsilon$ type,
   Wall laws: <<non-equilibrium>> type.

Fluid
   <<Fontaine au Bron>> oil: density=850 kg/m$^3$, kinematic viscosity=0.0083 m$^2$/s.

Boundary Conditions

The flow rate applied at the inlet: 500 l/hour and 1000 l/hour (0.12 kg/s and 0.236 kg/s).

The pressures at the outlets: the pressure is set at 0 relative bar at the oil outlet and the pressure values at the water/oil outlets are set depending on the case so as to maintain an 80% oil recovery ratio in relation to the total flow rate (recovery ratio=scrubbed oil flow rate/total flow rate). This condition is necessary because the separation ratio depends on the recovery ratio.

Convergence

The calculations are considered to be converged when the values of the residues of different parameters (mass, pressure and velocity) are stabilized at their minimum value and the mass balance of the system is below 1% of the total flow rate.

It can be checked that the time of passage of the fluid in the electrocoalescer is in accordance with the prescribed time: about 10 seconds for 500 l/h. This time is logically divided by a factor of 2 every time the flow rate is doubled. The length of the electrocoalescer can therefore be adjusted according to the nominal flow rate selected.

Passage through the centrifuge drives the fluid into an intense rotation. The centrifugal accelerations generated can be relatively great and equal to several ten times the acceleration of gravity. The goal sought is thus reached and maintenance of the motion by the helical wall all along the centrifuge is checked.

Rotation of the fluid at the centrifuge outlet is maintained in the separator but at a lower level since it is no longer guided. The centrifugal effect is however sufficient to maintain the major part of the drops on the periphery.

Ideally, the centrifuged particle flows out immediately through lateral opening 22 without being dispersed by the turbulence. This is the optimum situation.

The particle that has not been captured by the lateral opening can then remain centrifuged on the periphery of cone 20 and flow out through port 21 at the end of the tube.

The insufficiently centrifuged particle can be driven back by the turbulence to the centre of the flow and carried along by the oil backflow.

The performances appear to be very sensitive to the location and to the geometry of the outlet and discharge ports.

The size of the droplets must logically have an influence on the separation since it determines the contribution of the centrifugal force. This is confirmed by FIG. 4, which shows the results obtained for an 80% imposed oil recovery rate TRH, at a flow rate Q of 1000 l/h. The graph gives the proportion P of drops recovered as a function, on the abscissa, of the diameter of the drops G given in millimeter. It can be seen that the large drop diameters correspond to the highest separation ratios, but it is interesting to notice that the decrease of ratio P with diameter G is rapidly stabilized at a value of about 87%. This result shows that, below a drop diameter size of 0.1 mm, the diameter is apparently no longer a determining factor for the separation ratio in a device according to the invention.

The velocities of flow and the efficiency of the centrifuge directly depend on the flow rate applied in the system. A saturation phenomenon seems to appear above a flow rate of 2000 l/h for the device of this example.

For a given length of the centrifuge, the helical pitch greatly determines the separating power. The separation ratio is quasi-proportional to the pitch of the helix. It is therefore of interest to reduce the pitch, with however the moderation of the pressure drop, which increases more than linearly with the pitch.

The pressure drop in the device actually corresponds to the pressure that has to be applied at the inlet to provide a given flow rate.

The pressure drop is logically related to the centrifuge length and to the pitch of the helix. Its value tends to saturate when the length increases and, conversely, to increase parabolically with the pitch.

As regards the pumping powers, if pumping is required, at a flow rate of 2000 l/h, the pressure drop reaches 2.76 bars, which corresponds to a 130-kW net hydraulic power. On the other hand, this power does not exceed 3.5 kW at a flow rate of 500 l/h.

The design of a separator for water-in-oil emulsions must be suited to mixtures with hardly distinct densities and to the relatively high viscosity of the carrier fluid. Calculation by means of a direct fluid mechanics model, in the present case the FLUENT code, allows to delimit the difficulties involved.

The first difficulty consists in maintaining the rotating motion of the highly viscous carrier fluid. The helical wall (or line) seems to be a good means of transmitting this motion and of maintaining it, the pitch of the helix and its length being the parameters for adjusting the intensity of the centrifugal motion and its duration. The drawback of this solution is the pressure drop induced, but calculations show that it remains acceptable.

The main difficulty remains the separation of the water droplets from the carrier fluid. For centrifugation to effectively fulfil its function, it is necessary to reach high velocities and accelerations, which creates a high turbulence at the centrifuge outlet and the risk of dispersing again the droplets. Simulation clearly shows that configurations that are perfectly efficient with a laminar flow are made totally inefficient when the turbulence is taken into account.

Calculation allows to conveniently test various configurations and to select the best ones. It has thus allowed to determine a design allowing a 87% separation ratio at a flow rate of 1000 l/h, for an oil recovery ratio of 80%. Among the important parameters, the size of the droplets has been taken into account and calculation shows that its influence can be limited. Thus, in the case studied, the separation ratio tends to remain constant for diameters below 0.1 mm. It can be noted that this separation ratio is stabilized at a relatively high level (87%) even for small drop diameters (0.01 mm) for which conventional hydrocyclones are not very efficient.

What is claimed is:

1. A device for separating an effluent comprising phases of different density and conductivity, said device comprising a pair of electrodes, means for introducing the effluent between said electrodes, means intended for separation and discharge of said separated phases, characterized in that said separation means comprise at least one centrifuging element including a helical channel wherein said effluent is centrifuged after passing between said electrodes, wherein a section of flow of said helical channel is so determined that the velocity of the effluent increases in relation to the velocity of the effluent in the vicinity of said electrodes.

2. A device as claimed in claim 1, wherein said helical channel consists of a helical wall arranged in an annular space.

3. A device as claimed in claim 2, wherein said annular space is arranged between an internal tube and an external tube and said helical wall is in contact with said internal tube but provides a clearance (d) with the wall of said external tube.

4. A device as claimed in claim 1, wherein said helical channel consists of a helical tube.

5. A device as claimed in claim 1, wherein said electrodes exhibit the shape of cylinders arranged along the same axis.

6. A device as claimed in claim 1, wherein the discharge means comprise at least one port on the periphery of said centrifuged effluent so as to discharge at least part of the centrifuged phase.

7. A device as claimed in claim 1, wherein lighter phase is discharged through an axial line.

8. A device as claimed in claim 1, wherein the discharge means include a cyclone and an axial port for discharge of at least part of the centrifuged phase.

9. A method of separating an effluent comprising phases of different density and conductivity, comprising at least on electrocoalescence stage between two electrodes, a separation stage, a stage of discharge of said separated phases, characterized in that the separation stage follows the coalescence stage and comprises at least a stage of centrifugation of the effluent in a helical channel, wherein the centrifugation stage is such that the velocity of the effluent is increased in relation to the velocity thereof between said electrodes.

10. A method as claimed In claim 9, wherein a centrifuged phase discharge stage follows the centrifugation stage by means of a cyclone into which said helical channel opens.

11. A method as claimed in claim 9, wherein at least part of the centrifuged phase is discharged through at least one port arranged on the periphery of and downstream from said helical channel.

* * * * *